UNITED STATES PATENT OFFICE.

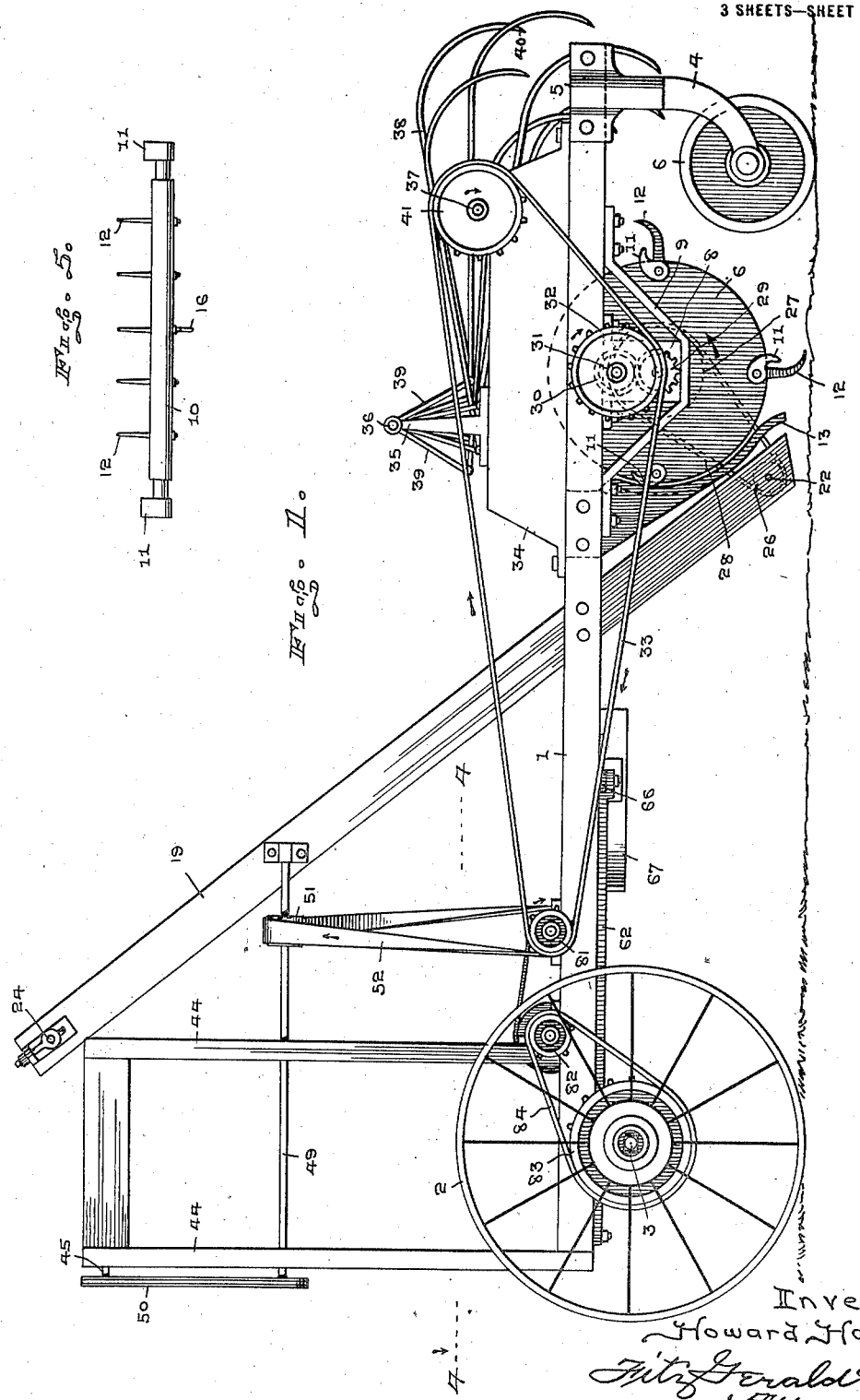

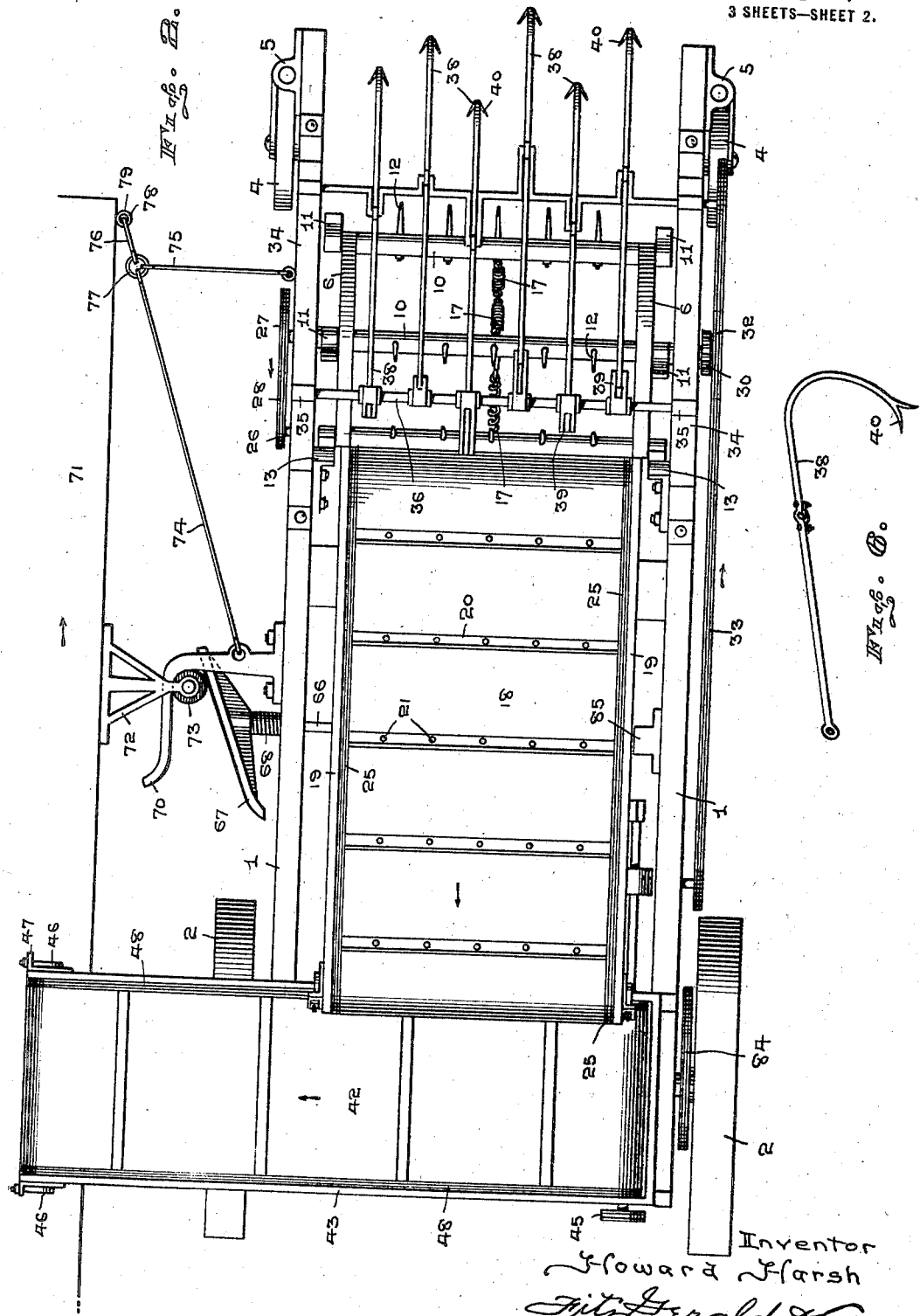

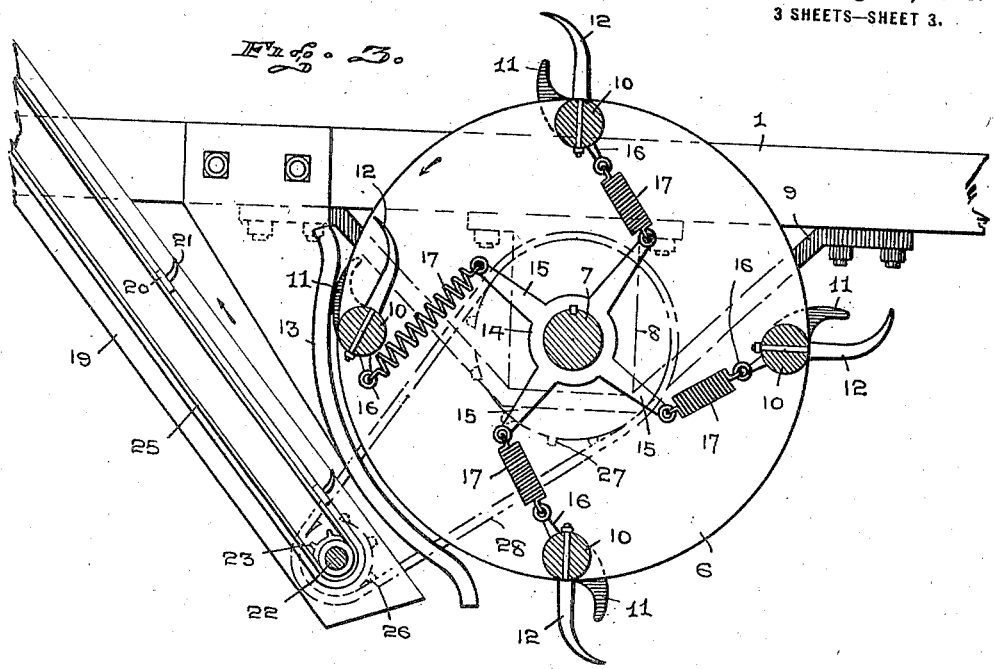
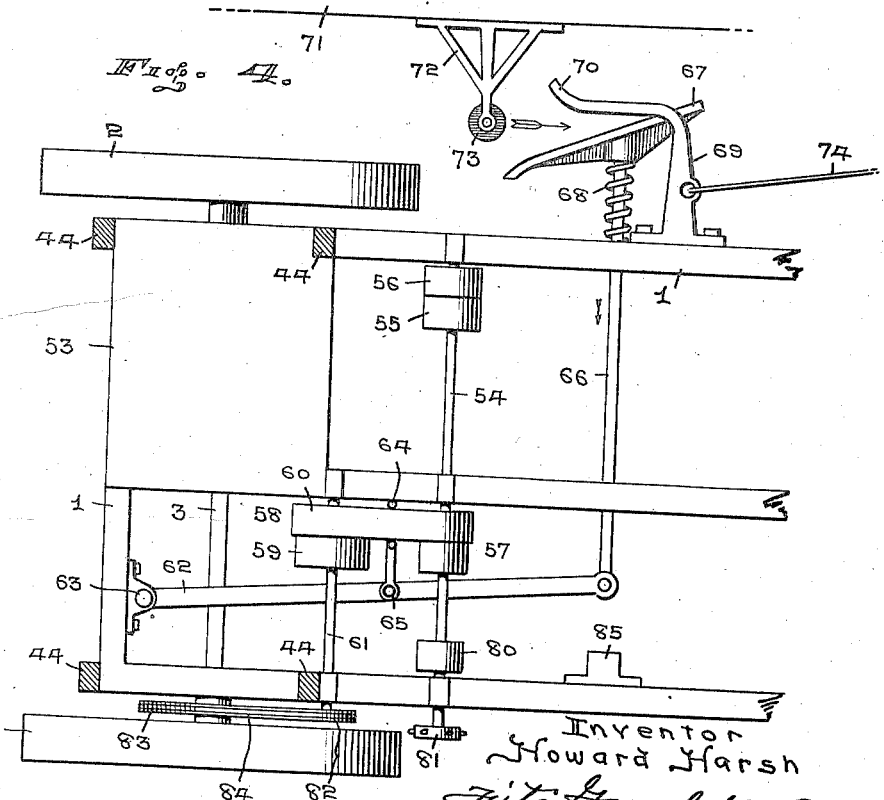

HOWARD HARSH, OF OSAKIS, MINNESOTA.

BUNDLE-LOADER.

1,275,680.

Specification of Letters Patent. Patented Aug. 13, 1918.

Application filed March 12, 1918. Serial No. 221,955.

*To all whom it may concern:*

Be it known that I, HOWARD HARSH, a citizen of the United States, residing at Osakis, in the county of Douglas and State of Minnesota, have invented certain new and useful Improvements in Bundle-Loaders; and I do hereby declare the following to be a full, clear, and exact description of the invention, such as will enable others skilled in the art to which it appertains to make and use the same.

This invention relates to bundle loaders, and has for its prime object to provide a machine of this character adapted to be attached to and propelled along beside of a hay wagon or other draft vehicle, to expeditiously gather and convey bundles or shocks of grain into the wagon.

A further object of the invention is to provide a bundle loader provided with suitable motive power to propel or assist in propelling it along beside of a draft vehicle, and by the use of which all side draft, usual in the ordinary bundle loaders attached to and drawn by the adjacent draft vehicle or hay wagon, is eliminated.

A still further object of the invention is to provide the bundle loader with power operating and propelling means and gear actuating mechanism therefor which is adapted to be actuated, when engaged by wagon carried means at the time the wagon is drawn up along beside of and attached to the bundle loader.

A still further object of the invention is to provide a flexible or loose connection between the bundle loader and wagon so that as the loader approaches a shock of grain and the wagon is stopped short of the shock, said connection will permit the loader under its own motive power to advance far enough to disengage the propelling power by the disconnection of the wagon carried gear actuating means from the power disconnecting means of the loader.

A further object of the invention is to provide the loader with a rotary cylinder having spring tensioned rock shafts provided with gripping fingers adapted to move out of and into the circumference of the cylinder to grip and discharge the bundles onto the conveyer apron.

A still further object of the invention is to provide the rear end of the loader with a plurality of raker arms for grabbing and raking the bundles or shocks of grain into the rotary loading cylinder.

With these and other objects in view as will appear as the description proceeds, the invention comprises the various novel features of construction and combination and arrangement of parts as will be more fully described hereinafter and afterward specifically claimed.

Referring to the drawings,

Figure 1 represents a side elevation of my improved bundle loader.

Fig. 2 represents a plan view thereof operatively attached to a draft vehicle.

Fig. 3 represents a detail vertical sectional view through the rotary loading cylinder and the adjacent inclined endless conveyer apron.

Fig. 4 represents a sectional plan view taken on a plane indicated by the line 4—4 on Fig. 1.

Fig. 5 represents a detail elevation of one of the finger rock shafts, and

Fig. 6 represents a detail perspective view of one of the raker arms.

In order that the construction and operation of the invention may be readily comprehended by those skilled in the art to which the invention relates, I have illustrated an improved embodiment thereof in the accompanying drawings and will now proceed to fully describe the same in connection with said drawings, in which 1 is the main frame of the bundle loader, supported at its rear end by wheels 2 journaled on the ends of an axle 3 attached to the main frame, and at its forward end by swivel supporting wheels 4 attached to bearings 5 carried by the opposite sides of the main frame.

A rotary loading cylinder is supported in bearings carried by the main frame adjacent the forward end thereof and comprises a pair of cylinder heads 6 rigidly mounted on a shaft 7, which latter is journaled in bearing blocks 8 mounted in truss frames 9 attached to the under side of the main frame. A plurality of rock shafts 10 are journaled in the heads 6 adjacent their peripheral edge and have cams 11 attached to their opposite ends. Each of these rock shafts is provided with a plurality of fingers 12.

13 indicates a pair of cam bars attached to the inner sides of the main frame and arranged in rear of and concentrically of the cylinder heads 6 so as to be engaged by each cam 11 as the cylinder rotates.

A spider is rigidly mounted on the shaft 7 and consists of a collar 14 having radial arms 15. Each rock shaft 10 is provided with an apertured lug 16 to each of which is connected one end of a retractile spring 17, the other end of the spring being connected to the outer end of the adjacent arm 15. The retractile tension of these springs 17 serve to normally hold the fingers 12 extended beyond the periphery of the cylinder heads and in a position to grip the bundles as they are raked into a position adjacent the cylinder. As the cylinder revolves, each cam 11 will successively engage the cam bars 13 and rock the shafts 10 sufficiently to disengage the fingers 12 from the bundles. It is to be noted that the rotary cylinder is so mounted with respect to the ground that the fingers 12 when extended will just clear the ground.

18 is an upwardly inclined endless apron mounted within a suitable frame 19 supported by the main frame 1. The apron is provided with cleats 20, each having a row of teeth 21 to engage and grip the bundles when discharged onto the apron by the rotary cylinder. 22 is an apron shaft mounted in the lower end of the supporting frame 19, and provided with sprocket wheels 23. 24 indicates an apron shaft adjustably mounted in the upper end of the frame 19 and also provided with sprocket wheels 23. Drive chains 25 are trained around these sprockets 23 and have attached to them the apron 18 and cleats 20. The lower apron shaft 22 is provided on one end with a sprocket gear 26, and the shaft 7 is provided with a sprocket gear 27 around both of which is trained a sprocket chain 28.

The opposite end of the cylinder shaft 7 is provided with a pinion 29 which meshes with a similar pinion 30 mounted on a stub shaft 31 carried by the bearing block 8. 32 indicates a drive sprocket mounted on the stub shaft, and engaged at its lower side by the lower stretch of a drive belt chain 33.

Mounted on opposite sides of the main frame adjacent the forward end thereof are bearing frames 34, and mounted upon each of them adjacent their rear ends is a bracket bearing 35 in which is mounted a shaft 36. A crank shaft 37 is mounted transversely on the forward ends of the bearing frames 34. A plurality of raker arms 38 are pivotally mounted intermediate their ends on the crank shaft and each has its rear ends pivotally connected to a connecting rod 39 loosely mounted on the shaft 36. The forward ends of the raker arms are curved downwardly and terminate in forked ends 40. A sprocket wheel 41 is mounted on one end of the crank shaft 37, and has the chain belt 33 trained over it. By this construction it will be apparent that as the crank shaft 37 is revolved, the raker arms will be moved upwardly and downwardly, forwardly and backwardly, to effectively rake in the bundles constituting the shock of grain, so that they may be effectively picked up by the rotary cylinder and deposited upon the conveyer apron 18.

42 is another endless conveyer apron mounted transversely of the main frame and disposed in a position immediately below the upper end of the inclined apron 18. This apron is also mounted in a supporting frame 43 supported by standards 44 on the main frame 1. Apron shafts 45 and 46 are mounted in the respective ends of the frame 43, the shaft 46 being adjustably mounted as indicated by the numeral 47 to permit of the apron being tightened when necessary. Each of these conveyer shafts is provided with sprockets connected by drive chains 48. 49 is a shaft journaled horizontally on the supporting standards 44 and the conveyer frame 19. One end of this shaft is provided with a sprocket wheel which is connected to a sprocket wheel on the end of the shaft 45 by a chain belt 50. The shaft also has mounted thereon a pulley 51 adapted to be driven by a belt 52.

By reference particularly to Fig. 4, it will be seen that the main frame 1 is provided with a platform 53 on which is adapted to be mounted suitable motive power such as a gasolene engine. A drive shaft 54 is mounted transversely on the main frame in advance of the engine platform and is provided with tight and loose pulleys 55 and 56 adapted to be driven from the engine, suitable means, of course, being employed to shift the driving belt from one pulley to the other in order to drive or idle the shaft as desired. The drive shaft 54 is also provided with a tight pulley 57 which is connected to tight and loose pulleys 58 and 59, respectively, by a belt 60, said pulleys 58 and 59 being mounted on a countershaft 61. 62 is a shifter lever pivotally mounted at one end as at 63 to the rear end of the main frame. A U-shaped shifter fork 64 embraces one stretch of the belt 60 and is pivotally connected to the intermediate portion of the lever 62 as at 65.

The forward end of the lever 62 is pivotally connected to a push rod 66 mounted transversely of the main frame. The outer end of this push rod is provided with a shoe 67 disposed at an angle with respect to the push rod, and positioned between the shoe and the side of the main frame is an expansible spring 68. 69 is an L-shaped bracket having one end attached to the side of the main frame and the other end extending rearwardly parallel to the side of the main frame and slightly curved outwardly as indicated by the numeral 70.

71 is a hay wagon or other suitable draft vehicle provided on one side with a bracket 72 carrying a roller 73 which is adapted to engage the shoe 67, when the wagon is drawn up along beside of the loader, to push the rod 66 inwardly and thus shift the belt 60 from the loose pulley 58 to the tight one 59. By the time that the roller 73 has passed over the shoe 67 a distance sufficient to cause the shoe to move inwardly far enough to shift the belt 60, it will be in a position against the laterally extending portion of the bracket 69, and thus serve to tie or hold the wagon and loader together for simultaneous movement forward. After the wagon has been drawn along beside of the loader and the belt 60 is shifted by engagement of the roller 63 with the shoe 67, the loader is further attached to the wagon by attaching rods 74, 75 and 76 connected by a link 77. The rod 76 is provided at one end with a hook 78 adapted to be engaged through an eye 79 carried by the wagon. By the construction and arrangement of the attaching rods, it will be apparent that provision is made for a slight difference in relative movement of the wagon and loader, for a purpose which will be presently explained.

The drive shaft 54 is also provided with a pulley 80 around which is trained the belt 52. The outer end of the shaft is provided with a sprocket 81 around which is trained the rear end of the chain belt 33 which serves to transmit power to the rotary cylinder and the crank shaft 37. The outer end of the countershaft 61 is provided with a sprocket 82 connected to a sprocket 83 on the rear axle 3 by a chain belt 84, whereby power may be transmitted from the drive shaft 54 to the rear wheels to propel or assist in propelling the loader forward.

In the operation of the machine, and when it is desired to use the same, the engine mounted on the platform 53 of the loader is started, so as to cause the endless aprons and the various other parts of the machine to operate. It is, of course, to be understood that the belt connected to the pulleys 55 and 56 can be shifted to either make the machine operative or inoperative when desired. With the drive shaft 54 revolving and the belt 60 engaging the loose pulley 58, the grain wagon is driven up along beside of the loader, so that the roller 73 will engage and actuate the shoe 67 inwardly of the main frame sufficiently to shift the belt 60 to the tight pulley 59, which will throw the loader in gear with the engine and thus cause the machine to move forward with the adjacent wagon.

By providing power means for propelling or assisting in propelling the loader forward rather than attaching the loader to the grain wagon and drawing it by the draft animals hitched to the wagon, all side draft to the loader is eliminated. It is also to be noted, by particular reference to Fig. 4, that the main frame is provided with a suitable cushioned stop 85 which serves to limit the inward movement of the push rod 66 to properly gage the shifting movement of the belt 60. By the time that the belt 60 has been shifted, the roller 73 will have moved into a position against the laterally extending part of the bracket 69, thus tying the binder and wagon together for forward movement. As soon as the wagon and binder have been positioned relatively as just described, the hook 78 is engaged within the eye 79, thus attaching the forward end of the wagon to the forward end of the loader, as clearly shown in Fig. 2. When the parts are so arranged, there will be a very slight, if any, relative lateral movement between the wagon and loader.

On the approach of the wagon and loader to a grain shock, the movement of the wagon is retarded or stopped at a point this side of the shock, which will, by virtue of the attaching rods 74, 75 and 76, permit of the loader to advance slightly beyond the wagon under its own power. This advance in movement of the loader with respect to the wagon will cause the shoe 67 to also advance from the roller 73, thus allowing the shoe to move outwardly under the expansive force of the spring 68, which movement in turn will shift the belt 60 from the tight pulley 59 to the loose pulley 58, thus stopping a further forward movement of the loader.

This hesitation or stopping in the forward movement of the loader and wagon will provide sufficient time for the raker arms 38 to disintegrate and rake in the bundles of the shock to a position to be gripped and picked up by the fingers 12 of the rotary cylinder and subsequently deposited on the conveyer apron 18. As soon as the bundles constituting the shock have been picked up and conveyed, by the respective aprons 18 and 42, into the wagon, the driver of the wagon will again cause it to move forward, which, as soon as the roller 73 pushes the shoe 67 inwardly, will cause the loader to be thrown into gear with its motive power, from which it will be apparent that the loader will again begin to move forward until the next shock of grain is reached, whereupon the same operation as just described will take place.

While I have described the principle of operation of the invention, together with the device which I now consider to be the best embodiment thereof, I desire to have it understood that such changes in construction and arrangement of parts may be made when desired as are within the scope of the appended claims.

Having thus described my invention, what I claim as new is:—

1. The combination with a wagon or other vehicle, of a bundle loader, power means for operating and propelling said bundle loader, means for throwing said power means into and out of gear with the propelling means for the bundle loader, and wagon carried means adapted when the wagon is positioned along beside of the bundle loader, to actuate said last-named means.

2. The combination with a wagon or other vehicle, of a bundle loader, power means for operating and propelling the loader, means for throwing said power means into and out of gear with the propelling means for the loader, means carried by the wagon adapted to actuate said last-named means and throw the power means into gear with the loader propelling means when the wagon is drawn up along beside the loader, and flexible means for connecting the forward ends of the wagon and loader.

3. The combination with a wagon or other vehicle, of a bundle loader, power means for operating and propelling said loader, means for throwing said power means into and out of gear with the propelling means for said loader, means carried by the wagon adapted when the wagon is drawn up along beside of the loader to actuate said last-named means and throw the power means into gear with the loader, propelling means and flexible means connecting the forward ends of the wagon and loader, said flexible means permitting the loader to move forward in advance of the wagon when the wagon has been brought to a stop a distance sufficient to disengage the wagon carried means from said power gear shifting means to stop the forward movement of the loader.

4. The combination with a wagon or other draft vehicle, of a bundle loader, power means for operating and propelling the loader, means for throwing said power means into and out of gear with the propelling means for said loader, said last-named means including a push rod projecting laterally from the loader, a shoe carried by said push rod, means carried by the wagon adapted to engage and push said shoe and rod inwardly of the loader when the wagon is drawn up into operative position beside of the loader, means carried by the loader adapted to limit the forward movement of said wagon carried means, and flexible means connecting the forward ends of the wagon and loader.

5. The combination with a wagon or other draft vehicle, of a bundle loader, power means for operating and propelling the loader, means for throwing said power means into and out of gear with the propelling means for the loader, said means embodying a push rod projecting laterally from the loader, a shoe carried by the push rod, means carried by the wagon adapted to engage and push the shoe inwardly when the wagon is drawn up into operative position beside of the loader, means to limit the forward movement of said wagon carried means, means for flexibly connecting the forward ends of the wagon and loader, and an expansible spring positioned on said push rod between the shoe and the side of the loader and adapted to move the shoe outwardly to throw said power means out of gear with the loader propelling means when said wagon carried means is disengaged from the shoe.

In testimony whereof I have signed my name to this specification in the presence of two subscribing witnesses.

HOWARD HARSH.

Witnesses:
E. H. ERICKSON,
EMIL HEDIN.